UNITED STATES PATENT OFFICE.

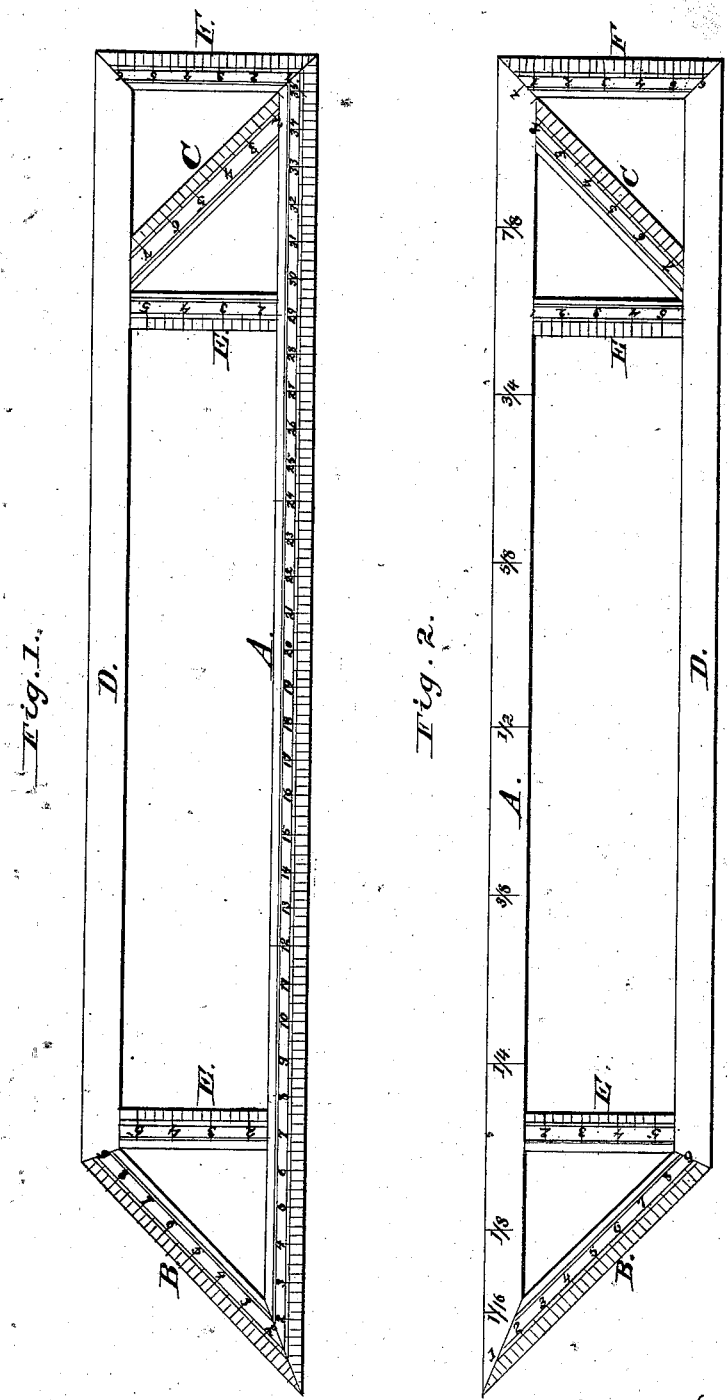

J. KIRK SOMES, OF SPRINGFIELD, MASSACHUSETTS, ASSIGNOR TO HIMSELF AND L. R. WAITE, OF SAME PLACE.

IMPROVEMENT IN BIAS-MEASURES.

Specification forming part of Letters Patent No. 192,135, dated June 19, 1877; application filed May 23, 1877.

*To all whom it may concern:*

Be it known that I, J. KIRK SOMES, of Springfield, in the county of Hampden and in the State of Massachusetts, have invented a new and useful Improvement in Bias-Measures; and I do hereby declare that the following is a full, clear, and exact description thereof, reference being had to the accompanying drawing, making a part of this specification, in which—

Figure 1 is a plan view of one side of my improved yard-stick and bias-measure. Fig. 2 is a similar view of the opposite side of the measure.

The invention consists in certain improvements on the bias-measure for which Letters Patent of the United States, No. 183,076, were granted to me October 10, 1876, said improvements relating to certain cross-bars placed between the two long parallel bars, and provided with scales on one or both sides to aid in adjusting the measure, and to indicate the actual width which the strips will take when cut, and to the making of one end square to aid in cutting square or straight trimmings, as hereinafter more fully set forth.

The same letters of reference are used in both figures in the designation of identical parts.

The measure may be made of wood, metal, paper, vulcanized rubber, or any other suitable material.

A in the drawings represents the longer bar corresponding to the yard-stick bar of my former patent. The bias-bars B and C project in reverse directions from the opposite ends of the bar A at an angle of forty-five degrees, and may be made one-quarter of a yard in length, more or less. Their outer ends are connected by a bar, D, parallel with the yard-stick bar. Each of the bias-bars is graduated on both sides with the common scale of linear measure.

E represents one or more cross-bars passing between the two parallel bars, A and D, at right angles thereto. These cross-bars may be placed near the ends or at or near the center. They serve to give strength to the measure, and keep it from warping. They have the common linear scale in inches and fractions of an inch on one or both sides.

The scales on the bars E aid in adjusting the measure so as to cut the desired width of the strip when known. When the measure is adjusted with reference to the quantity of material to be consumed, by means of the scale on the bias-bar, the scale on the cross-bar will serve to indicate the width which the strip will have when cut.

By these scales on the bias and cross bars respectively the user of the implement can readily tell how much material in selling-measure is required to produce a strip of any given width, or how wide a bias strip any given number of inches in selling-measure will produce, the selling measure being always the distance along the selvage of the goods.

To enable the measure to be used in cutting square or straight as well as bias trimmings, I have extended the back bar D at one end, and united the two parallel bars, A and D, by the bar F, at right angles thereto, making this end of the measure square. The measure still being provided with bias-bars at both ends, it may be used without changing position or reversing the goods, whether measuring from right to left or from left to right. In cutting straight trimmings, place the bar F parallel to the selvage of the goods. This brings the parallel bars directly across the goods, and the guiding-lines may then be marked thereon.

It may be found desirable to make the joints of metal when the measure is principally constructed of other material. For very wide goods I make the bar A a yard and a quarter, more or less, and lengthen the bar D correspondingly. The graduations on the several bars may be according to the metric system, or any common and well-know system of linear measure.

What is claimed as the invention is—

1. In a bias-measure, the combination of a long bar, A, a bias-bar at an acute angle thereto, provided with the common English metric or equivalent scale of linear measure, and a bar, E, at right angles to bar A, also provided with such scale, substantially as described.

2. As an article of manufacture, the bias-measure herein described, consisting of the two parallel bars, A D, bias-bars B C at either end, respectively, with scale on both sides, cross-bars E, with scale, and bar F uniting one end of bar A with extended end of bar D.

J. KIRK SOMES.

Witnesses:
FRED. SEFTON,
H. G. GILMORE.